July 26, 1927.
G. P. DEMPLER
FLUID CONTROL VALVE
Filed Aug. 23, 1926
1,636,859
2 Sheets-Sheet 1
FIG. I.
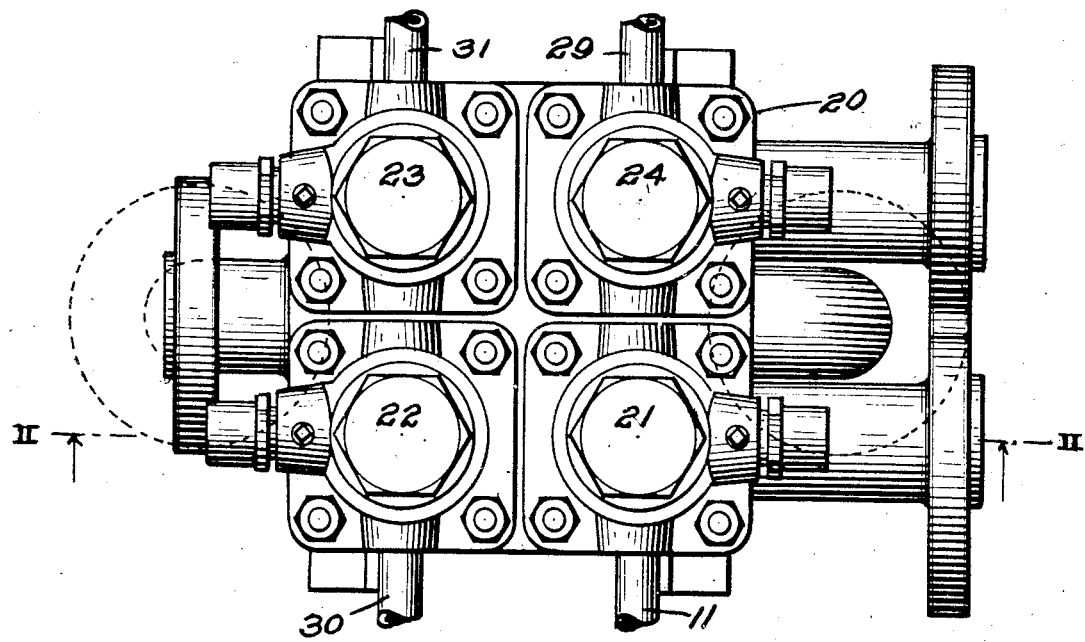
FIG. II.
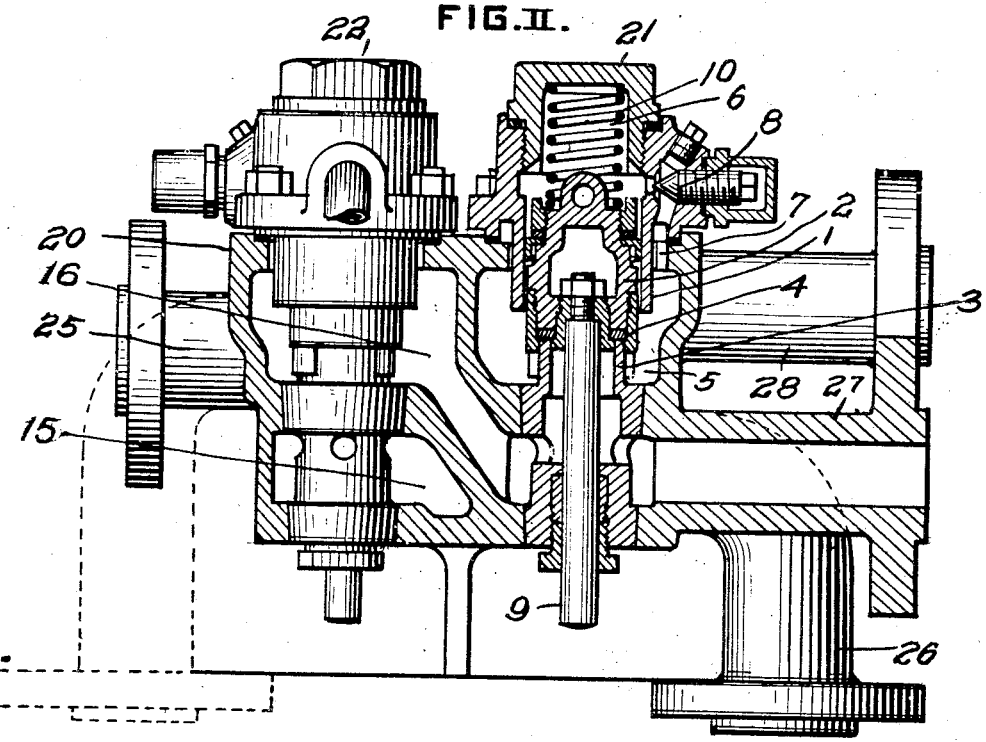
WITNESSES
J. Herbert Bradley
Joseph C. Miller
INVENTOR
George P. Dempler
by Christy and Christy
his attorneys July 26, 1927.
G. P. DEMPLER
1,636,859
FLUID CONTROL VALVE
Filed Aug. 23, 1926
2 Sheets-Sheet 2
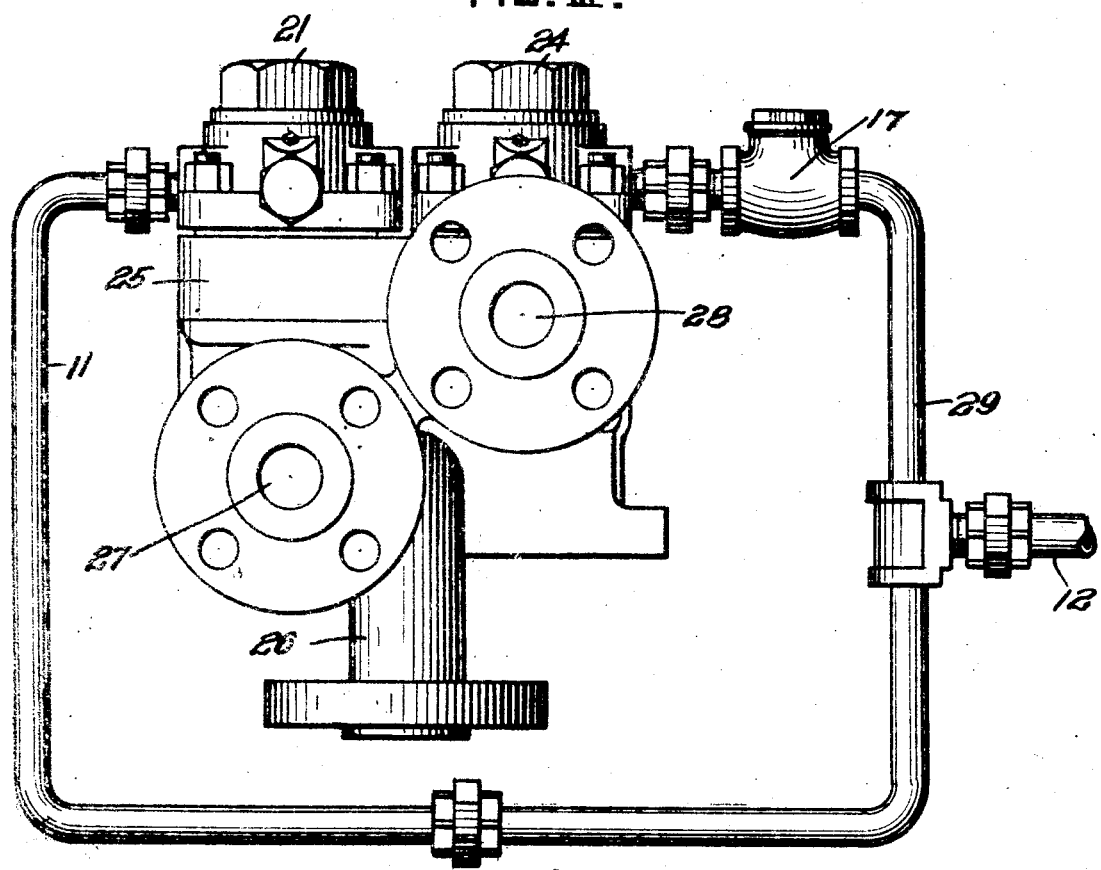
FIG. III.
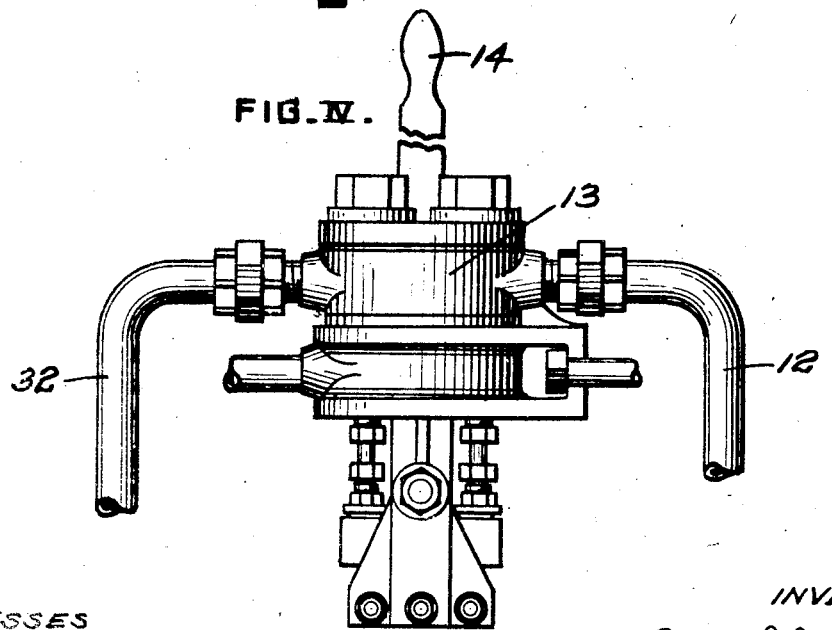
FIG. IV.
WITNESSES
J. Herbert Bradley
Joseph C. Miller
INVENTOR
George P. Dempler
by Christy and Christy
his attorneys Patented July 26, 1927.

1,636,859

UNITED STATES PATENT OFFICE.

GEORGE P. DEMPLER, OF PITTSBURGH, PENNSYLVANIA.

FLUID-CONTROL VALVE.

Application filed August 23, 1926. Serial No. 130,785.

My invention relates to improvements in valves for control of the flow of fluid under pressure, and consists in the provision of a pilot valve and in such an arrangement of ports and passages that the opening and closing of the valve may be effected by fluid pressure and in sequence upon a proper shifting of the pilot valve. The pilot valve is so arranged that it may be shifted with inconsiderable effort. In the operation of hydraulic cylinders, such for example as those ordinarily employed in association with rolling mills, the shifting of the control valve requires the expenditure of considerable muscular effort, and since the shifting of the valve must be repeated at frequent intervals the operator becomes physically fatigued, and the fatigue of this operator becomes an important factor in rolling-mill operation. The introduction of my invention eliminates that factor from the situation.

In the accompanying drawings a valve structure is shown in which my invention is embodied. It is a complex structure, including four valve elements, and is adapted to effect the powerful to-and-fro traverse of the piston of a hydraulic cylinder. Fig. I shows the valve structure in plan; Fig. II shows it in vertical section, on the plane indicated by the broken line II—II, Fig. I; and Fig. III is a view in end elevation. Fig. IV is a view in elevation of the pilot valve casing. The connections will be understood on comparing Fig. IV with Figs. I and II, and particular explanation will be given in the ensuing specification.

Referring first to Fig. II, within a suitable casing a cylinder 1 is provided, and within the cylinder a piston 2 is reciprocable. The piston carries the valve, and in this particular application the valve is built integrally with the piston. As the piston reciprocates the valve is shifted to and from its seat. In this particular application of the invention the valve seat takes the form of an up-standing cylindrical wall 3, the valve body is provided with a corresponding cylindrical recess 4, and the opening and closing of the valve is accomplished in a telescopic movement of the valve relatively to the seat and in a direction which is axial with respect to the cylindrical parts. The valve casing is so introduced into the line of flow that fluid under pressure from a suitable source of supply has access to the valve through an inlet chamber 5 which is external of and circumferentially arranged with respect to cylindrical wall 3, while delivery from the valve is internal, through the cylindrical passage defined by wall 3. The piston 2 on one side is directly exposed to the pressure or head of the fluid which fills chamber 5, and this pressure tends to open the valve. Cooperating with this and tending also to open the valve, is the residual pressure in the chamber on the delivery side of the valve. On the opposite side the piston forms a wall of a chamber 6 and from chamber 5 there is access of fluid to chamber 6 through a passageway 7. Within passageway 7 is an adjustable throttle which conveniently takes the form of the needle valve 8, by means of which the effective size of the passageway may be varied and delicately adjusted. The piston 2 may on the side which is exposed to fluid pressure within chamber 5 and to the residual pressure on the down-stream side of the valve, be provided with a stem 9 which, extending through a packing gland in the wall of the casing, has the effect of reducing the effective area of the piston as a pressure-sustaining member. And on its opposite side a spring 10 may be provided, tending to hold the valve to its seat.

Turning to Figs. I, III, and IV, it is to be remarked that chamber 6 is in communication, through pipes 11 and 12 with a valve casing 13. Within casing 13 is a valve controlled by a lever 14, and by the lever 14 the valve may be shifted alternately to vent chamber 6 to the atmosphere and to close such venting. The valve within casing 13 is so proportioned that when open it serves to relieve pressure within chamber 6 more rapidly than pressure can be restored by the flow of fluid from chamber 5 through the restricted passageway 7 to chamber 6.

Given a supply of fluid under pressure in communication with chamber 5, and given connection for flow of fluid through the valve port to a fluid-pressure cylinder or other instrumentality for the application of pressure, the operation of the valve structure in which my invention resides will be manifest. When fluid pressure is to be applied the pilot valve within valve casing 13, is shifted from closed to open position. Following upon the opening of the valve fluid pressure within chamber 6 is relieved, and since the breach which the opening of the pilot valve effects is greater than the restricted passage 7 can make good, the balance of the forces to which piston 2 is subjected are so far disturbed that piston 2 moves upward and the main valve rises from its seat 3. So long as the pilot valve continues open the condition brought about as just described continues, and fluid pressure is transmitted to the cylinder or other power-driven apparatus. When the transmission of fluid pressure is to be cut off the pilot valve within casing 13 is closed. Thereupon flow from chamber 6 is cut off. Passageway 7 remains open, and accordingly pressure within chamber 6 rises. The original preponderance of forces is restored, the piston 2 descends, and the main valve closes.

It will be perceived that as distinguished from the shifting of the main valve from closed to open position and then to closed position again, which could be directly effected only at the expenditure of considerable muscular effort, the shifting of the pilot valve (since it is subject to forces of relatively insignificant magnitude) may be effected, without appreciable muscular effort. And in this elimination of substantial muscular effort the benefit and advantage of the invention is realized.

The drawings show an organization of valves in a compound structure, adapted to control the operation of a hydraulic cylinder. Partitions divide the space within the casing 20 into an inlet chamber, two intermediate chambers, and an outlet chamber. An intake lead 25 is constantly open to the inlet chamber 5; the outlet chamber 15 is constantly open to a delivery lead 26; and the intermediate chambers (one of which is in Fig. II designated 16) are constantly open, one to each of two service leads 27 and 28. Four valves, identical in structure and one of which has been particularly described, control communication, two of them (whose positions are indicated at 21 and 23) from the inlet chamber severally to the two intermediate chambers; the other two valves (whose positions are indicated at 22 and 24) correspondingly control communication severally from the two intermediate chambers to the outlet chamber.

Pipe 11, as has been said, leads from chamber 6, and a pipe 29 leads from the corresponding chamber of the valve whose position is indicated at 24, and these two pipes continue in the common pipe 12 and open to valve chest 13. Similarly the corresponding chambers of the valves whose positions are indicated at 22 and 23 have communication through pipes 30, 31, and 32 with the same valve chest 13. The valve within valve chest 13 is double: When the operating lever 14 stands in the vertical position shown in Fig. IV both valves within the chest are closed. The shifting of lever 14 to the right opens one of the valves; the shifting to the left opens the other. Return of the lever to vertical position allows the previously opened valve to close. Thus the two valves may be opened alternately, and the pairs of chambers connected, one pair to pipe 12 the other to pipe 32, may be vented alternately to the atmosphere. When the pair of chambers associated with valves 21 and 24 are so vented through pipe 12, the two valves designated are opened, fluid under pressure from the source of supply passes the valve positioned at 21 and advances through lead 27 to one end of the hydraulic cylinder while the cylinder at its opposite end is opened through lead 28 and the valve positioned at 24 to the outlet 26. This condition continues so long as lever 14 continues in unchanged position. When the piston in the hydraulic cylinder has made its stroke and the reverse stroke is to be effected, lever 14 is swung from one extreme, through the neutral erect position shown in Fig. IV, to its opposite extreme position. When it reaches neutral the pilot valve within chest 13 previously open is closed, and in consequence, the valves positioned at 21 and 24 close in the manner already described. The further swing of the lever effects the opening of the valves positioned at 22 and 23 precisely as the valves positioned at 21 and 24 previously had opened. Through the valve positioned at 23 water under pressure from supply lead 25 has access through lead 28 to that end of the hydraulic cylinder which had last been in communication with outlet 26; while the opposite end of the cylinder, hitherto in communication with supply, now is vented through passageway 27 and the valve positioned at 22 with the outlet 26.

A check valve whose position is indicated by the casing 17 which contains it, is arranged in the branch conduit which opens communication from the valve chest 13 to the pressure chamber above the valve positioned at 24 (22) which corresponds to chamber 6 above the valve positioned at 21. This check valve serves to prevent back pressure from chamber 6 from reaching the corresponding chamber of the valve positioned at 24. A like check valve will be understood to be associated with the valve positioned at 22.

Having described the valve element as an entity and having for purposes of illustration merely shown it organized with other like elements in a compound organization it remains only to say that the invention in broader aspect lies not in the compound organization but in the valve element as an entity.

I claim as my invention:

1. In valve mechanism for controlling the flow of fluid under pressure, the combination of fluid supply and fluid delivery passageways, two valves arranged one in each passageway, two pneumatically operated motor elements to which the two said valves are severally connected, and means for relieving simultaneously the pressure to which the said motor elements are upon one side subjected.

2. In valve mechanism for controlling the flow of fluid under pressure the combination of a casing containing an inlet chamber two intermediate chambers and an outlet chamber and provided with an intake lead opening to said inlet chamber two service leads communicating one with each of the two said intermediate chambers and a delivery lead opening from said outlet chamber, four valves of which two severally control communication from said inlet chamber to said intermediate chambers and two severally control communication from said intermediate chambers to said outlet chamber, and constituting two pairs of valves adapted to establish reversible conditions of pressure and relief through said leads, four pneumatically operated motor elements, one connected to each of said valves, and means for relieving simultaneously the pressure to which the motor elements of the valves of either pair are upon one side subjected.

In testimony whereof I have hereunto set my hand.

GEORGE P. DEMPLER.